United States Patent
Seo et al.

(10) Patent No.: US 9,497,649 B2
(45) Date of Patent: Nov. 15, 2016

(54) METHOD AND APPARATUS FOR TAKING MEASUREMENTS ON NEIGHBORING CELLS IN WIRELESS COMMUNICATION SYSTEMS

(71) Applicant: LG ELECTRONICS INC., Seoul (KR)

(72) Inventors: Inkwon Seo, Anyang-si (KR); Hanbyul Seo, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 14/376,711

(22) PCT Filed: Feb. 12, 2013

(86) PCT No.: PCT/KR2013/001082
§ 371 (c)(1),
(2) Date: Aug. 5, 2014

(87) PCT Pub. No.: WO2013/119096
PCT Pub. Date: Aug. 15, 2013

(65) Prior Publication Data
US 2015/0029884 A1 Jan. 29, 2015

Related U.S. Application Data

(60) Provisional application No. 61/597,181, filed on Feb. 10, 2012, provisional application No. 61/599,391, filed on Feb. 15, 2012.

(51) Int. Cl.
*H04W 24/08* (2009.01)
*H04W 36/00* (2009.01)
*H04W 24/10* (2009.01)

(52) U.S. Cl.
CPC ............ *H04W 24/08* (2013.01); *H04W 24/10* (2013.01); *H04W 36/0088* (2013.01)

(58) Field of Classification Search
CPC H04W 36/0088; H04W 24/10; H04W 24/08
See application file for complete search history.

(56) References Cited

U.S. PATENT DOCUMENTS

2007/0252761 A1* 11/2007 Koorapaty ............ G01S 5/0205
342/464
2010/0322097 A1 12/2010 Jen
(Continued)

FOREIGN PATENT DOCUMENTS

KR 10-2010-0105824 9/2010
KR 10-2010-0117522 11/2010
(Continued)

OTHER PUBLICATIONS

European Patent Office Application Serial No. 13746706.4, Search Report dated Nov. 16, 2015, 8 pages.
(Continued)

*Primary Examiner* — Anez Ebrahim
(74) *Attorney, Agent, or Firm* — Lee, Hong, Degerman, Kang & Waimey

(57) ABSTRACT

The present invention relates to a method by which a terminal takes measures on a neighboring cell in a wireless communication system, which includes the steps of: receiving a channel state information-reference signal (CSI-RS) transmitted from the neighboring cell by using first time information received from a serving cell; and taking measurements using the CSI-RS, wherein the first time information is generated on the basis of the second time information of a serving cell, which receives an uplink signal from the terminal, and the third time information from a neighboring cell, which receives the uplink signal.

14 Claims, 9 Drawing Sheets

(56) References Cited

U.S. PATENT DOCUMENTS

| | | | |
|---|---|---|---|
| 2011/0117926 A1* | 5/2011 | Hwang | ............... H04W 64/00 455/456.1 |
| 2011/0199986 A1 | 8/2011 | Fong et al. | |

FOREIGN PATENT DOCUMENTS

| | | |
|---|---|---|
| KR | 10-2011-0011508 | 2/2011 |
| WO | 2011/013990 | 2/2011 |
| WO | 2011/019357 | 2/2011 |
| WO | 2012/015238 | 2/2012 |

OTHER PUBLICATIONS

PCT International Application No. PCT/KR2013/001082, Written Opinion of the International Searching Authority dated May 9, 2013, 1 page.

* cited by examiner

FIG. 5
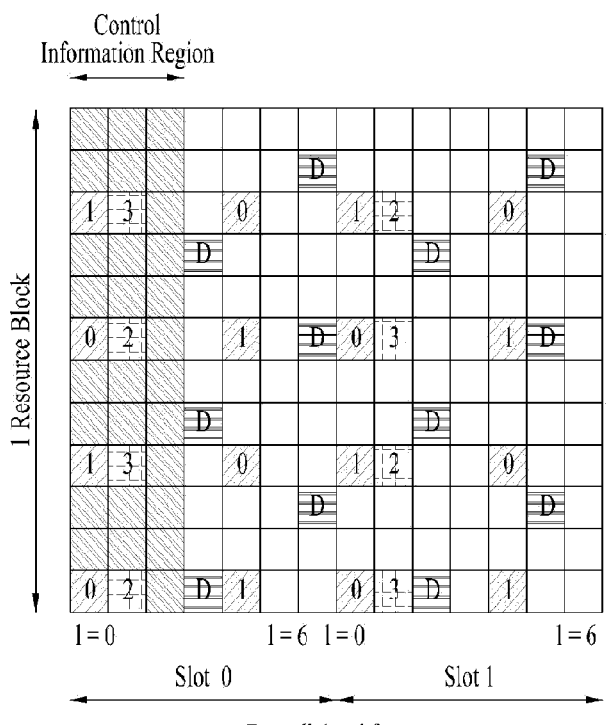
(a)
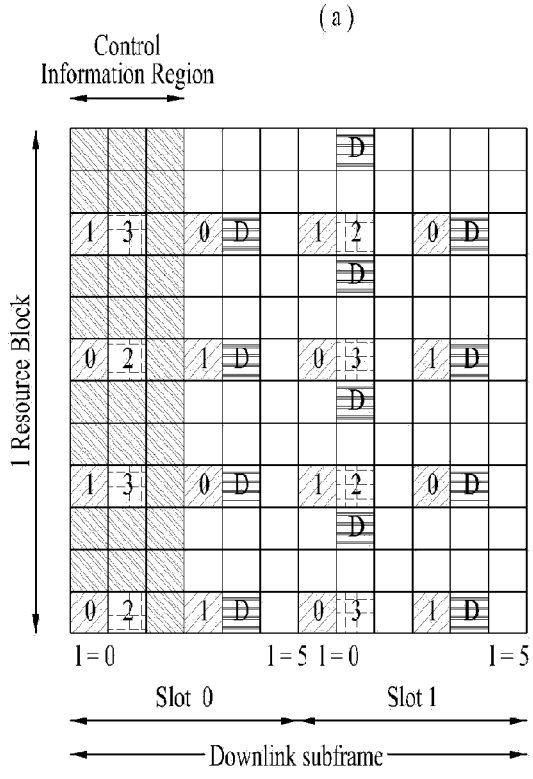
(b)

FIG. 6

METHOD AND APPARATUS FOR TAKING MEASUREMENTS ON NEIGHBORING CELLS IN WIRELESS COMMUNICATION SYSTEMS

CROSS-REFERENCE TO RELATED APPLICATIONS

This application is the National Stage filing under 35 U.S.C. 371 of International Application No. PCT/KR2013/001082, filed on Feb. 12, 2013, which claims the benefit of U.S. Provisional Application Ser. Nos. 61/597,181, filed on Feb. 10, 2012, and 61/599,391, filed on Feb. 15, 2012, the contents of which are all hereby incorporated by reference herein in their entirety.

TECHNICAL FIELD

The present invention relates to a wireless communication system, and more particularly to a method and apparatus for performing measurement report with respect to a neighbor cell.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a technology for measuring a neighbor cell having a time boundary different from that of a serving cell.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for allowing a user equipment (UE) to measure a neighbor cell in a wireless communication system including: receiving a channel state information-reference signal (CSI-RS) from the neighbor cell using first time information received from a serving cell; performing measurement using the CSI-RS, wherein the first time information is generated on the basis of second time information of a serving cell having received an uplink (UL) signal from the UE and third time information of the neighbor cell having received the UL signal.

In a second technical aspect of the present invention, a method for allowing a base station (BS) to receive a measurement report of a neighbor cell from a user equipment (UE) includes: transmitting first time information used by the user equipment (UE) configured to receive a channel state information-reference signal (CSI-RS) from the neighbor cell, receiving measurement report information obtained by the CSI-RS from the UE, wherein the first time information is generated on the basis of second time information of the BS having received an uplink (UL) signal from the UE and third time information received from the neighbor cell having received the UL signal.

In a third technical aspect of the present invention, a user equipment (UE) for use in a wireless communication system includes: a reception (Rx) module; and a processor, wherein the processor receives a channel state information-reference signal (CSI-RS) from the neighbor cell using first time information received from a serving cell, and performs measurement using the CSI-RS, wherein the first time information is generated on the basis of second time information of a serving cell having received an uplink (UL) signal from the UE and third time information of the neighbor cell having received the UL signal.

In a fourth technical aspect of the present invention, a base station (BS) for use in a wireless communication system includes: a transmission (Tx) module; and a processor, wherein the processor transmits first time information used by the user equipment (UE) configured to receive a channel state information-reference signal (CSI-RS) from the neighbor cell, receives measurement report information obtained by the CSI-RS from the UE, wherein the first time information is generated on the basis of second time information of the BS having received an uplink (UL) signal from the UE and third time information received from the neighbor cell having received the UL signal.

The first to fourth technical aspects may include all or some parts of the following items.

The first time information may be a time difference between a first time at which a signal transmitted from the serving cell arrives at the UE and a second time at which a signal transmitted from the neighbor cell arrives at the UE.

The first time information may include a time difference between the second time information and the third time information.

The second time information and the third time information may indicate timing information at which the uplink signal is received by each cell on the basis of a specific time commonly used by the serving cell and the neighbor cell.

The serving cell may be configured to transmit information associated with the UL signal configuration to the neighbor cell.

The method may further include: receiving at least one CSI-RS configuration including a CSI-RS configuration of the neighbor cell.

The first time information may be contained in the CSI-RS configuration and then transmitted to the UE.

The UE may correct a CSI-RS configuration of the neighbor cell by a specific value corresponding to the first time information, and thus receives CSI-RS from the neighbor cell.

The first time information may include time duration information to be tracked by the UE configured to receive the CSI-RS from the neighbor cell.

The third time information may be transferred from the neighbor cell to the serving cell through an X2 interface.

The uplink (UL) signal may be a sounding reference signal (SRS).

[Advantageous Effects]

As is apparent from the above description, the embodiments of the present invention can perform measurement without acquiring a separate cell from a neighbor cell having a time boundary different from that of a serving cell.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

FIG. 6 is a conceptual diagram illustrating a channel status information-reference signal (CSI-RS).

BEST MODE

Figure 1:
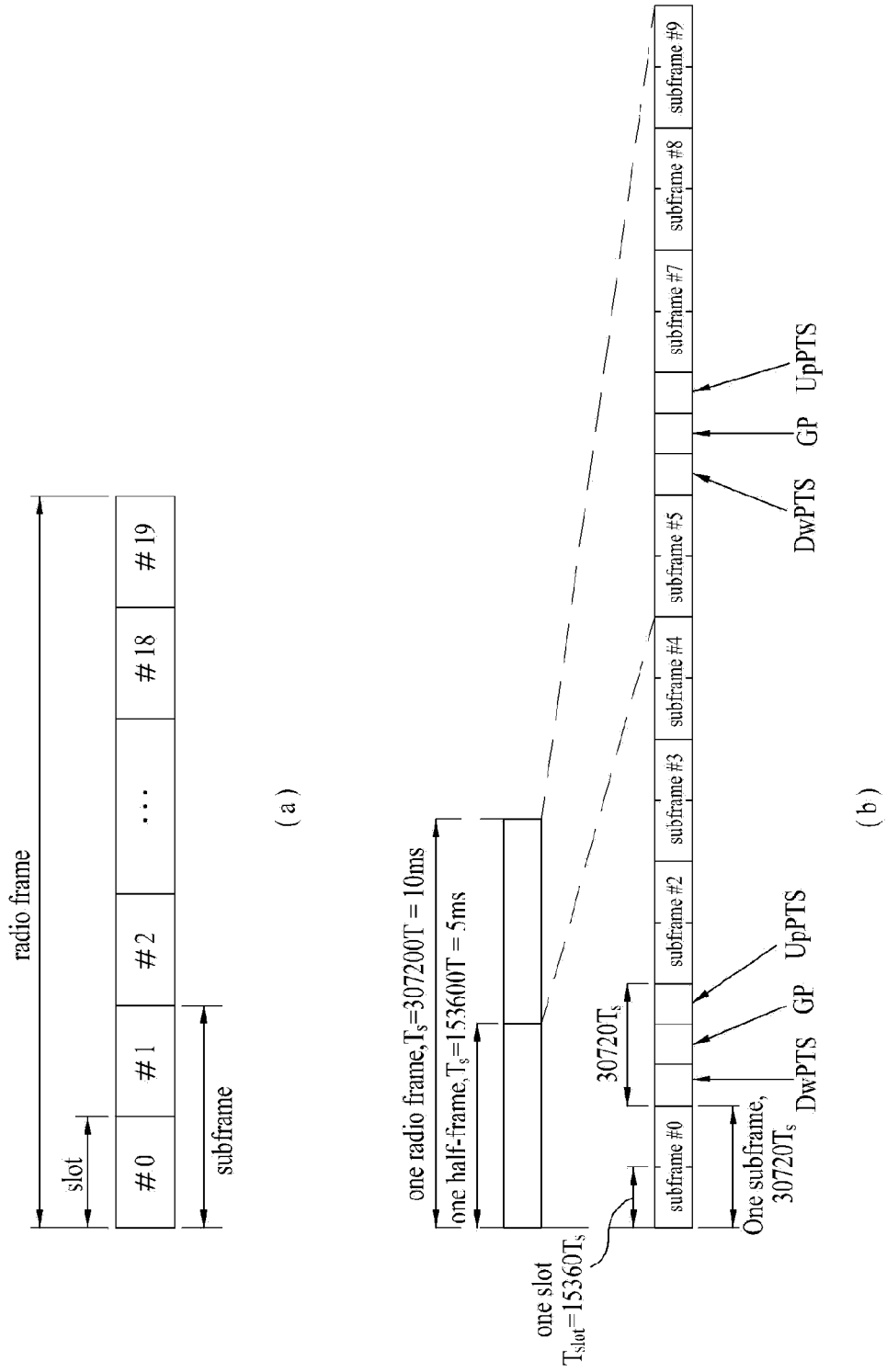
FIG. 1 exemplarily shows a downlink radio frame structure.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
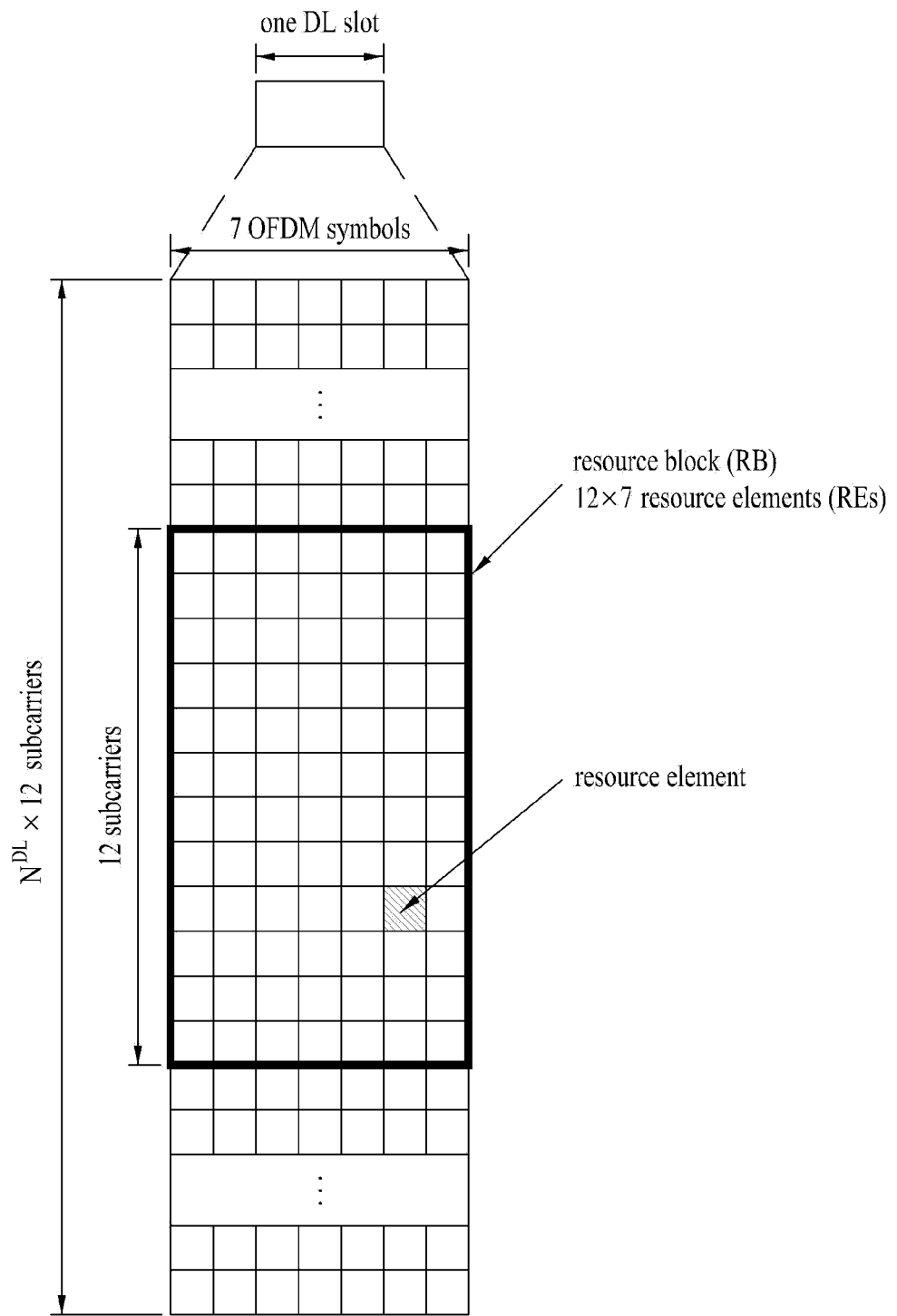
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
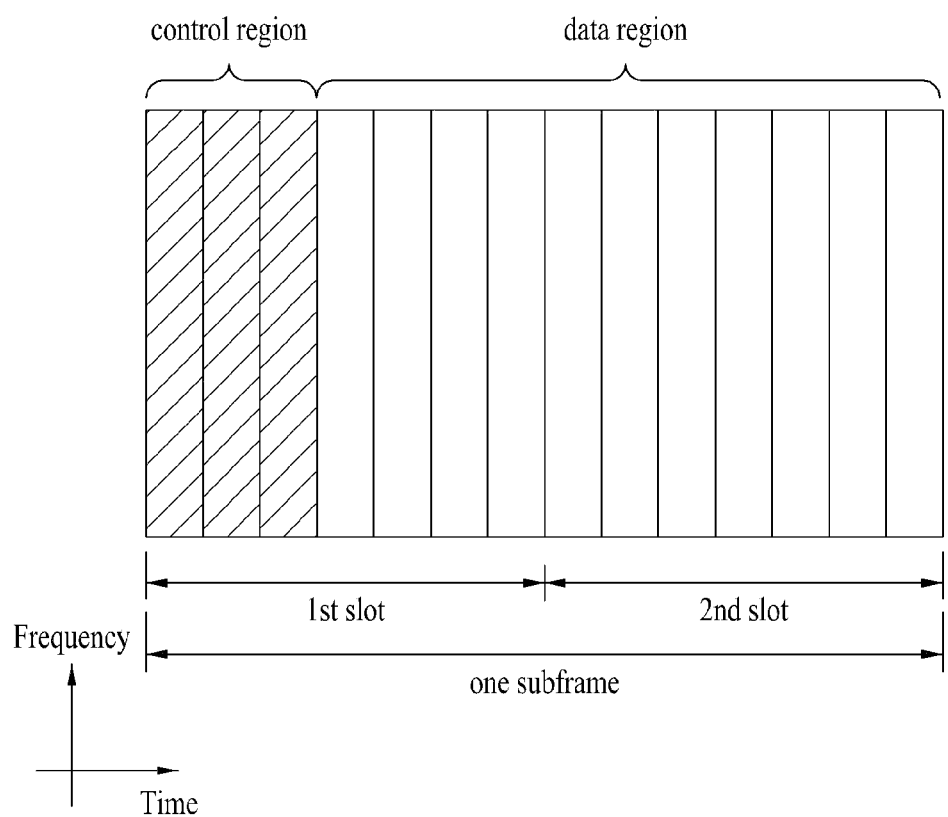
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI)). In order to indicate a random access response that is a response to a transmission of a random access preamble of a user equipment, CRC can be masked with RA-RNTI (random access-RNTI).

Figure 4:
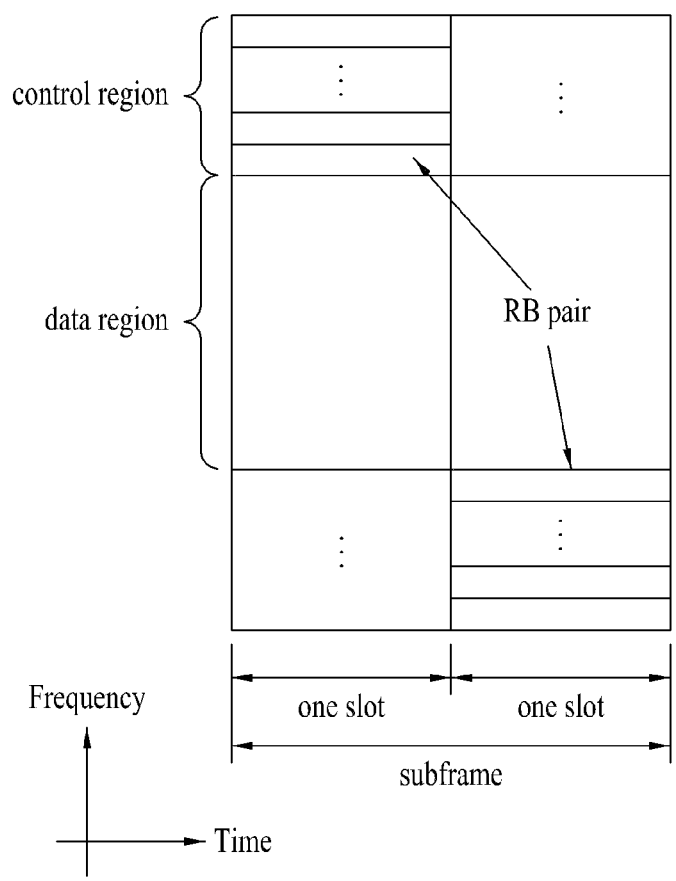
FIG. 4 exemplarily shows an uplink subframe structure.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a cell-specific reference signal (CRS) shared by all UEs in the cell, ii) a UE-specific reference signal for a specific UE, iii) a demodulation-reference signal (DM-RS) transmitted for coherent demodulation if a PDSCH is transmitted, iv) a channel state information-reference signal (CSI-RS) for delivering channel state information (CSI) if a downlink DMRS is transmitted, v) an MBSFN reference signal transmitted for coherent demodulation of a signal transmitted in a multimedia broadcast single frequency network (MBSFN) mode, and vi) a positioning reference signal used to estimate geographical position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation. The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

FIG. 5 is a diagram illustrating a pattern in which CRSs and DRSs defined in a legacy 3GPP LTE system (e.g., release-8) are mapped onto resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 5(a)) and 12 OFDM symbols in case of an extended CP (FIG. 5(b)).

FIG. 5 shows locations of the reference signals on the RB pairs in a system in which the base station (BS) supports four transmit antennas. In FIG. 5, resource elements (REs) denoted by "0", "1", "2" and "3" represent the locations of the CRSs for antenna port indices 0, 1, 2 and 3. Meanwhile, the RE denoted by "D" represents the location of the DMRS.

Channel State Information-Reference Signal (CSI-RS)

CSI-RS is an RS used for channel measurement in an LTE-A system supporting up to eight antenna ports on downlink. CSI-RS differs in this aspect from CRS used for both channel measurement and data demodulation and thus, unlike CRSs, it is not necessary to transmit CSI-RSs in every subframe. CSI-RS is used in Mode 9. For data demodulation, DMRS is used.

More specifically, CSI-RSs may be transmitted through 1, 2, 4 or 8 antenna ports. Antenna port 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following equation 1.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \cdots, N_{RB}^{max,DL} - 1$$

Where $r_{l,n_s}(m)$ denotes the generated CSI-RSs, $c(i)$ denotes a pseudo-random sequence, $n_s$ is a slot number, l is an OFDM symbol index, and $N_{RB}^{max,DL}$ denotes the maximum number of RBs in a downlink bandwidth.

The CSI-RSs generated by Equation 1 may be mapped to REs on a per-antenna port basis by the following equation 2.

$$a_{k,l}^{(p)} = w_{l''} \cdot r_{l,n_s}(m') \quad \text{[Equation 2]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

-continued $$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \cdots, N_{RB}^{DL} - 1$$

$$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

CSI-RS corresponding to antenna port 0 or 1. In this case, CSI-RS corresponding to two antenna ports may be mapped to the same RE, and each CSI=RS may be identified by different orthogonal codes.

As described before, CSI-RSs are transmitted in a specific subframe, not in every subframe. Specifically, CSI-RSs may be transmitted in a subframe satisfying the following equation 3, referring to a CSI-RS subframe configuration as illustrated in [Table 2] below.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

TABLE 1

| | CSI reference signal configuration | Number of CSI reference signals configured | | | | | |
| --- | --- | --- | --- | --- | --- | --- | --- |
| | | 1 or 2 | | 4 | | 8 | |
| | | (k', l') | $n_s$ mod 2 | (k', l') | $n_s$ mod 2 | (k', l') | $n_s$ mod 2 |
| Frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | | | | | |
| | 13 | (4, 2) | | | | | |
| | 14 | (3, 2) | | | | | |
| | 15 | (2, 2) | | | | | |
| | 16 | (1, 2) | | | | | |
| | 17 | (0, 2) | | | | | |
| | 18 | (3, 5) | | | | | |
| | 19 | (2, 5) | | | | | |
| Frame structure | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 6:
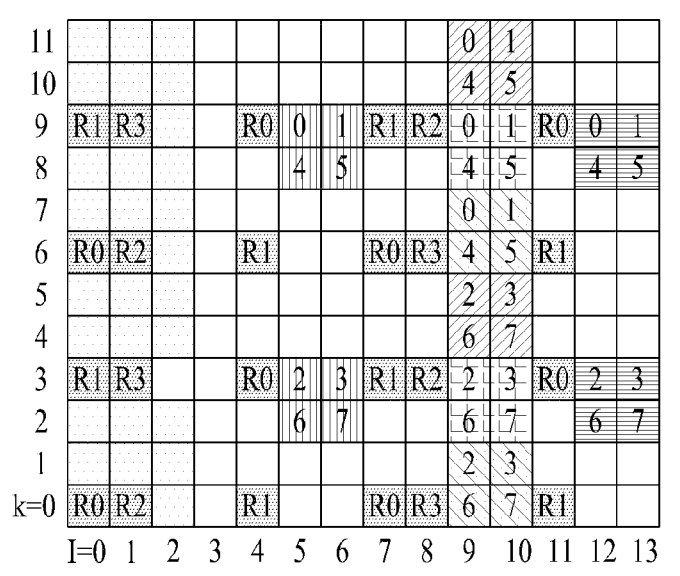

In FIG. 6, CSI-RSs are mapped to REs on a per-antenna port basis according to a specific CSI-RS configuration by Equation 1 and Equation 2. In FIG. 3, R0 to R3 denote that CRSs are mapped to respective antenna ports, and each number represents that CSI-RS is mapped to each antenna port. For example, RE denoted by 0 or 1 may be mapped to $$(10n_f + \lfloor n_s/2 \rfloor - \Delta_{CSI-RS}) \bmod T_{CSI-RS} = 0$$

where $T_{CSI-RS}$ denotes the transmission period of CSI-RSs, $\Delta_{CSI-RS}$ is an offset, $n_f$ is a system frame number, and $n_s$ is a slot number.

The CSI-RS may be signaled to the UE as CSI-RS config information element shown in Table 3.

TABLE 3

```
CSI-RS-Config-r10 ::=              SEQUENCE {
    csi-RS-r10                         CHOICE {
        release                            NULL,
        setup                              SEQUENCE {
            antennaPortsCount-r10              ENUMERATED {an1,
an2, an4, an8},
            resourceConfig-r10                 INTEGER (0 . . . 31),
            subframeConfig-r10                 INTEGER (0 . . . 154),
            p-C-r10                            INTEGER
(−8 . . . 15)
        }
    }
                                       OPTIONAL,        -- Need ON
    zeroTxPowerCSI-RS-r10              CHOICE {
        release                            NULL,
        setup                              SEQUENCE {
            zeroTxPowerResourceConfigList-r10  BIT STRING (SIZE
(16)),
            zeroTxPowerSubframeConfig-r10      INTEGER (0 . . . 154)
        }
    }
                                       OPTIONAL         -- Need ON
}
```

In Table 3, 'antennaPortsCount-r10' may indicate the number of antennas needed for CSI-RS transmission (for example, one, two, four, or eight antennas may be selected), 'resourceConfig-r10' may indicate which RE of a single RB is located on time-frequency frequencies, 'subframeConfig-r10' may indicate which subframe is used for data transmission, and a CSI-RS EPRE value with respect to PDSCH EPRE is transmitted. In addition, the eNB may further transmit zero power CSI-RS information.

'resourceConfig-r10' contained in 'CSI-RS Config' may indicate a CSI-RS transmission position, and may indicate the positions of symbols and subcarriers contained in one RB according to the CSI-RS configuration numbers (shown in Table 1) denoted by 0 to 31.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs.

That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Measurement/Measurement Report

A measurement report is used in many techniques designed to ensure the mobility of UEs (handover, random access, cell search, etc.) or for one of the techniques. Since the measurement report requires a certain degree of coherent demodulation, a UE may perform measurement after acquiring synchronization and physical layer parameters, except for measurement of received signal strength. The measurement report conceptually covers Radio Resource Management (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has failed.

RSRP is defined as the linear average over the power contributions of REs that carry downlink CRSs.

RSSI is defined as the linear average of the total received power of a UE. The RSSI is measured from OFDM symbols carrying RSs for antenna port 0, including interference and noise power from neighbor cells. If a specific subframe is indicated for RSRQ measurement by higher-layer signaling, the RSSI is measured over all OFDM symbols of the indicated subframe.

RSRQ is defined as (NxRSRP/RSSI), where N is the number of RBs over the measurement bandwidth of RSSI.

Transmission or non-transmission of a measurement report can be determined by the following event-based measurement report decisions i) to v).

i) In Decision i), a measurement value of the serving cell is higher than an absolute threshold value (i.e., serving cell becomes better than absolute threshold).

ii) In Decision ii), a measurement value of the serving cell is lower than an absolute threshold value (i.e., serving cell becomes worse than absolute threshold).

iii) In Decision iii), a measurement value of a neighboring cell is higher than a measurement value of the serving cell by an offset value (i.e., neighboring cell becomes better than an offset relative to the serving cell).

iv) In Decision iv), a measurement value of a neighboring cell is higher than an absolute threshold value (i.e., neighboring cell becomes better than absolute threshold).

v) In Decision v), a measurement value of the serving cell is lower than an absolute threshold value, and a measurement value of the neighboring cell is higher than another absolute threshold value (i.e., serving cell becomes worse than one absolute threshold and neighboring cell becomes better than another absolute threshold).

In Decisions (i)-(v), the measurement value may be an RSRP, etc.

Measurement reporting may be transmitted only when individual conditions for the above-mentioned decisions are maintained for a predetermined time or longer configured in a network.

Basically, measurement reporting is performed using CRS. In an embodiment of the present invention, measurement reporting may be performed using one or a selective combination of CRS, CSI-RS, and DMRS. In addition, the measurement reporting may also be performed with respect to a specific antenna port(s) from among antenna ports through which RSs are transmitted or with respect to a specific RS configuration (e.g., a plurality of CSI-RS configurations may be allocated to the same subframe, and each CSI-RS configuration may include CSI-RSs for 2, 4, or 8 ports which may be transmitted at different time points).

If measurement report is performed using CSI-RS, the measurement report result may also be used to measure a neighbor cell (i.e., a contiguous cell, a Tx point having no additional cell ID, a cell/Tx point contained in a CoMP set.). To this end, the BS may inform the UE of a CSI-RS configuration used by a neighbor cell so as to perform CoMP and/or interference measurement, and the UE may measure CSI-RS to be transmitted according to specific CSI-RS configuration (indicated by the BS) from among CSI-RS configurations of the neighbor cell. In addition, CSI-RS configurations of multiple cells including a serving cell may be signaled (i.e., multiple CSI-RSs are configured), so that signal intensity of several cells may be measured. However, a timing point (e.g., a subframe boundary) between a serving cell and a neighbor cell is not aligned, so that the measurement action is incorrectly performed. In this case, for correct measurement, synchronization (or tracking) of the corresponding neighbor cell (or CSI-RS configuration) may be performed. However, this additional synchronization may unavoidably increase complexity, and may unexpectedly affect communication with a serving cell.

The embodiments of the present invention will disclose various methods for enabling a UE to measure a neighbor cell using CSI-RS when a subframe boundary between the serving cell and the neighbor cell is not aligned.

Embodiment 1

Embodiment 1 can signal a timing difference between the serving cell and the neighbor cell (i.e., a time-domain boundary between the serving cell and the neighbor cell). In this case, the UE may measure signal intensity of the corresponding CSI-RS configuration using the signaled timing difference. A detailed description thereof will hereinafter be described with reference to FIGS. 7 and 8.

Figure 7:
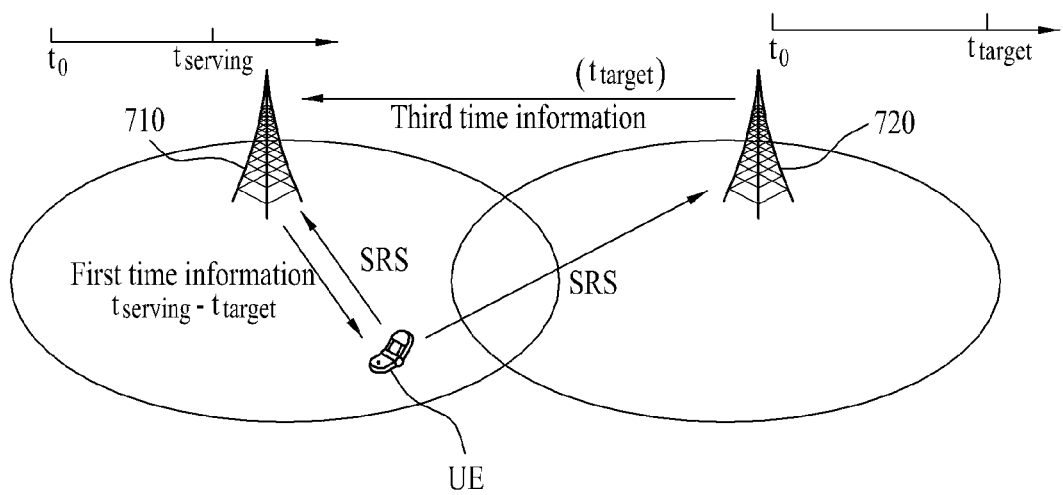
FIGS. 7 and 8 are conceptual diagrams illustrating the embodiments of the present invention.

Referring to FIG. 7, a base station (BS) 710 (hereinafter referred to as a serving BS) of the serving cell, a base station (BS) 720 (hereinafter referred to as a target BS) of the neighbor cell, and a user equipment (UE) are shown. In this case, the target BS is a BS of a specific neighbor cell from among a plurality of neighbor cells contiguous to the serving cell. A signaling and/or operation between Tx/Rx entities under the environment shown in FIG. 7 are sequentially shown in FIG. 8.

Figure 8:
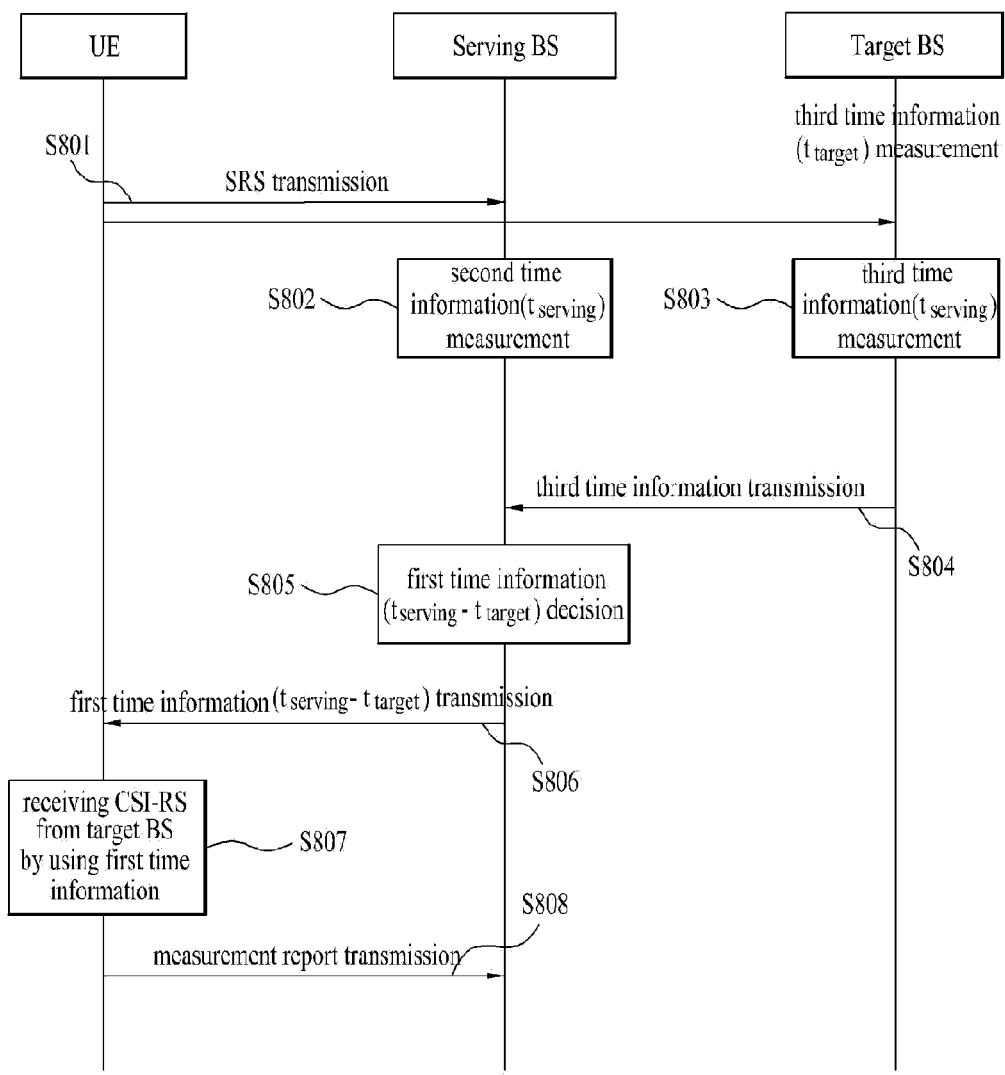

Referring to FIG. 8, the UE may transmit an uplink signal (e.g., SRS) to the target BS and the serving BS in step S801. In order for the target BS to receive the SRS from the UE, the target BS needs information related to SRS configuration used by the UE. This information may be pre-received from the serving BS through X2 signaling or the like.

In step S802, the serving BS may measure the second time information (tserving). The target BS may measure third time information (ttarget) in step S803. The second time information may be an absolute time during which SRS arrives at the serving BS. The third time may be an absolute time during which SRS arrives at the target BS. In this case, the absolute time is commonly used by the serving BS and the target BS. For example, the absolute time may be a global time. Referring to FIG. 7, the serving BS and the target BS may calculate an absolute time that is commonly known to the serving BS and the target BS, and may also calculate a specific time during which SRS arrives at each BS after starting from t0.

In step S804, the target BS may transmit third time information to the serving BS. The above transmission may be achieved by X2 interface between the serving BS and the target BS. To this end, the serving BS may request third time information related to a specific UE from the target BS.

In step S805, the serving BS may decide third time information received from the target BS, and may decide first time information from the third time information measured by the serving BS. That is, the first time information may be denoted by (tserving-ttarget) indicating a time difference (i.e., timing offset) between the second time information and the third time information. This first time information (tserving-ttarget) may be equivalent to a time difference between a first signal transmitted from the serving BS and a second signal transferred from the target BS to the UE.

In step S806, the serving BS may transmit first time information to the UE. In this case, transmission information of the first time information may indicate specific information indicating which CSI-RS configuration is associated with the first time information. In contrast, the above transmission information may be contained in transmission information of CSI-RS configuration that is transferred from the serving BS to the UE. In addition, the first time information may be signaled in the same manner as in the legacy TA signaling method (corresponding to an integer multiple of a predetermined time).

In step S807, the UE may receive CSI-RS transferred from the target BS on the basis of first time information received from the serving BS. In other words, the UE may amend CSI-RS configuration used by the target BS by a predetermined value corresponding to the first time information, so that the UE may receive the CSI-RS from the target BS. For example, assuming that first time information is denoted by t1 and a specific time at which CSI-RS will be transmitted according to CSI-RS configuration used by the target BS is denoted by t2, the UE may correct CSI-RS configuration to (t2−t1), so that the UE may receive CSI-RS according to the corrected CSI-RS configuration. That is, after the corresponding CSI-RS configuration is advancing (or leading) by first time information (i.e., if the first time information is positive (+)), or is delayed (or lagging) by the first time information (i.e., if the first time information is negative(−)), the above measurement may be carried out.

In step S808, the UE may transmit measurement report information to the serving BS on the basis of the measured result upon receiving the received CSI-RS.

Embodiment 1 may be made available when cell acquisition or tracking is not performed. However, if tracking is not performed at all, the first time information signaled by either a difference in Tx−Rx propagation delay from each BS or reflection may be changed, resulting in reduction of measurement accuracy. In other words, long-time tracking for measurement accuracy may greatly increase processing overhead. Accordingly, in addition to the above-mentioned embodiment 1, a method for restrictively performing such tracking may be used as necessary.

The tracking operation may be carried out using a searching window having a predetermined length, and a search time for tracking may be reduced using the first time information. To this end, uncertainty duration information along with the first time information (tserving-ttarget) may be signaled for each CSI-RS configuration. In this case, uncertainty duration information may be interpreted as specific information for guaranteeing the presence of the corresponding CSI-RS configuration frame (or subframe) boundary in '(first time information±uncertainty duration)' on the basis of a time boundary (e.g., a subframe boundary) of the serving cell. This specific information is recognized by the BS. If the boundary of the corresponding CSI-RS configuration is not present in the corresponding duration, the CSI-RS configuration boundary may be used as an indicator that need not measure the corresponding CSI-RS configuration. Alternatively, the uncertainty duration is predefined, resulting in reduction of signaling overhead. Accordingly, when the UE having received the uncertainty duration information and the first time information measures the corresponding CSI-RS configuration, tracking can be performed within (first time information+uncertainty duration information) on the basis of (first time information−uncertainty duration information).

Embodiment 2

For measurement of the neighbor cell of the UE, the BS may configure CSI-RS of the neighbor cell and may signal the timing relationship between the serving cell and the neighbor cell. In more detail, the serving BS may signal specific information indicating whether a time-domain boundary (e.g., a subframe boundary or a frame boundary) between the neighbor cell and the serving cell that are to be measured by the UE has been aligned for measurement.

As the above signaling method, one bit is added to CSI-RS configuration contained in a plurality of CSI-RS configurations, so that specific information as to whether timing (with the serving cell) is aligned can be signaled.

In addition, if the added one bit is set to zero, synchronization (or tracking of the corresponding CSI-RS) with the corresponding cell may be indicated to perform measurement of the corresponding CSI-RS configuration. If the added one bit is set to 1, measurement of the corresponding cell can be performed without additional synchronization (or tracking).

In this case, a decision reference for indicating whether synchronization (or tracking) will be carried out may be defined as an exemplary case in which time-domain boundary interval between both cells is equal to, or larger than a predetermined time. The UE having received the above timing information may decide whether to perform synchronization (or tracking) according to the corresponding information, and signal intensity measurement of cells in which inter-cell timing is well aligned can be performed without synchronization (or tracking).

Embodiment 3

Embodiments 1 and 2 have disclosed a method for enabling the UE to receive CSI-RS from the neighbor cell on the basis of information received from the BS. Embodiment 3 has disclosed methods for solving the above problems through BS processing instead of UE processing.

Embodiment 3 provides a method for performing synchronization between the BSs using the following two methods.

First, Embodiment 3 provides a method for allowing the BS to delay a time boundary by propagation delay. In more detail, BS 1 or BS 2 may measure a specific time during which a Tx signal (e.g., CRS, CSI-RS, etc.) from the other party arrives at BS 1 or BS 2, and BS 1 or BS 2 may delay its own time boundary by the measured propagation delay. If necessary, the serving BS may command another target BS to advance (or delay) a time boundary, and the measured propagation delay may be shared through X2 interface or the like. Alternatively, instead of requesting timing coordination from the target BS, the serving BS may coordinate its own timing.

Thereafter, the BS may command UEs of the cell to measure CSI-RS of the counterpart cell, and the UE may measure the corresponding CSI-RS without additional cell acquisition. Assuming that the UE performs tracking, if the uncertainty duration is signaled or pre-configured, only a duration within the range of (serving-cell boundary±uncertainty-duration boundary) can be tracked even when CSI-RS of the counterpart cell is measured.

Second, the UE may coordinate Rx timing of a Tx signal of each BS using a specific time at which SRS from the UE arrives at each BS. Referring back to FIG. 8, instead of transmitting the first time information to the UE in step S806, the serving BS may request the target BS to perform timing coordination according to the first time information. Thereafter, the BS may command a plurality of UEs of the cell to measure CSI-RS of the counterpart cell, and the UE may measure the corresponding CSI-RS without additional cell acquisition. Alternatively, instead of the operation for requesting the target BS to perform timing coordination, the serving BS may coordinate its own timing. When the UE performs tracking, if the uncertainty duration is signaled or predefined, only a duration within the range of (serving-cell boundary±uncertainty-duration boundary) can be tracked even when CSI-RS of the counterpart cell is measured.

Figure 9:
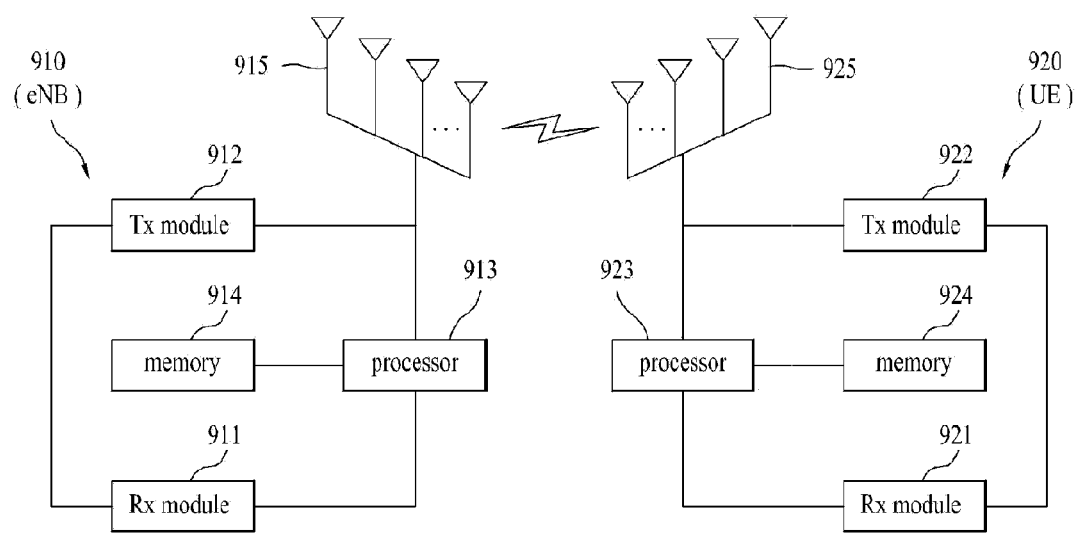
FIG. 9 is a block diagram illustrating a transceiver apparatus applicable to embodiments of the present invention.

FIG. 9 is a block diagram illustrating a BS (eNB) device and a UE device according to the embodiments of the present invention.

Referring to FIG. 9, the BS device 910 according to the present invention may include a reception (Rx) module 911, a transmission (Tx) module 912, a processor 913, a memory 914, and a plurality of antennas 915. The plurality of antennas 915 indicates a BS device for supporting MIMO transmission and reception. The reception (Rx) module 911 may receive a variety of signals, data and information on an uplink starting from the UE. The Tx module 912 may transmit a variety of signals, data and information on a downlink for the UE. The processor 913 may provide overall control to the BS device 910.

The processor 913 of the BS device 910 according to one embodiment of the present invention can process various operations needed for the above-mentioned embodiments.

The processor 913 of the BS device 910 processes information received at the BS device 910 and transmission information to be transmitted externally. The memory 914 may store the processed information for a predetermined time. The memory 914 may be replaced with a component such as a buffer (not shown).

Referring to FIG. 9, the UE device 920 may include an Rx module 921, a Tx module 922, a processor 923, a memory 924, and a plurality of antennas 925. The plurality of antennas 925 indicates a UE apparatus supporting MIMO transmission and reception. The Rx module 921 may receive downlink signals, data and information from the BS (eNB). The Tx module 922 may transmit uplink signals, data and information to the BS (eNB). The processor 923 may provide overall control to the UE device 920. The processor 923 of the UE device 920 according to one embodiment of the present invention can process various operations needed for the above-mentioned embodiments.

The processor 923 of the UE device 920 processes information received at the UE device 920 and transmission information to be transmitted externally. The memory 924 may store the processed information for a predetermined time. The memory 924 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 910 shown in FIG. 9 may be applied to a relay node (RN) acting as a DL transmission entity or UL reception entity without departing from the scope or spirit of the present invention. In addition, the description of the UE device 920 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for allowing a user equipment (UE) to measure a neighbor cell in a wireless communication system, comprising:

receiving first time information from a serving cell;

receiving a plurality of channel state information—reference signal (CSI-RS) configurations from the serving cell, the plurality of CSI-RS configurations including a CSI-RS configuration associated with the neighbor cell;

determining whether or not to correct the CSI-RS configuration associated with the neighbor cell by a predetermined value corresponding to the first time information; and receiving a CSI-RS from the neighbor cell based on a corresponding one of a corrected or uncorrected CSI-RS configuration; and performing a channel state measurement using the CSI-RS.

2. The method according to claim 1, further comprising:

receiving, from the serving cell, alignment information indicating whether a time-domain boundary interval between the neighbor cell and the serving cell is equal to, or larger than a predetermined time, wherein the UE corrects the CSI-RS configuration by the predetermined value corresponding to the first time information, when the alignment information indicates that the time-domain boundary interval between the neighbor cell and the serving cell is not larger than the predetermined time, and wherein the UE does not correct the CSI-RS configuration, when the alignment information indicates that the time-domain boundary interval between the neighbor cell and the serving cell is equal to, or larger than the predetermined time.

3. The method according to claim 1, further comprising:

transmitting an uplink signal to the serving cell and the neighbor cell, wherein the first time information is generated based on second time information of the serving cell having received the uplink signal from the UE and third time information of the neighbor cell having received the uplink signal.

4. The method according to claim 3, wherein the uplink signal is a sounding reference signal (SRS).

5. The method according to claim 3, wherein the first time information includes a time difference between the second time information and the third time information.

6. The method according to claim 3, wherein the third time information is transferred from the neighbor cell to the serving cell through an X2 interface.

7. The method according to claim 1, wherein the CSI-RS configuration indicates which subframe is used for transmitting the CSI-RS.

8. A user equipment (UE) for use in a wireless communication system, comprising:

a reception (Rx) module; and a processor operatively connected to the Rx module and configured to:

receive first time information from a serving cell, receive a plurality of channel state information—reference signal (CSI-RS) configurations from the serving cell, the plurality of CSI-RS configurations including a CSI-RS configuration associated with the neighbor cell, determines whether or not to correct the CSI-RS configuration associated with the neighbor cell by a predetermined value corresponding to the first time information, receive a CSI-RS from the neighbor cell based on a corresponding one of a corrected or uncorrected CSI-RS configuration, and perform a channel state measurement.

9. The UE according to claim 8, wherein the processor receives, from the serving cell, alignment information indicating whether a time-domain boundary interval between the neighbor cell and the serving cell is equal to, or larger than a predetermined time, wherein the processer corrects the CSI-RS configuration by the predetermined value corresponding to the first time information, when the alignment information indicates that the time-domain boundary interval between the neighbor cell and the serving cell is not larger than the predetermined time, and wherein the processor does not correct the CSI-RS configuration, when the alignment information indicates that the time-domain boundary interval between the neighbor cell and the serving cell is equal to, or larger than the predetermined time.

10. The UE according to claim 8, further comprising:

a transmission (Tx) module, wherein the processor controls the Tx module to transmit an uplink signal to the serving cell and the neighbor cell, and wherein the first time information is generated based on second time information of the serving cell having received the uplink signal from the UE and third time information of the neighbor cell having received the uplink signal.

11. The UE according to claim 10, wherein the uplink signal is a sounding reference signal (SRS).

12. The UE according to claim 10, wherein the first time information includes a time difference between the second time information and the third time information.

13. The UE according to claim 10, wherein the third time information is transferred from the neighbor cell to the serving cell through an X2 interface.

14. The UE according to claim 8, wherein the CSI-RS configuration indicates which subframe is used for transmitting the CSI-RS.

* * * * *